Feb. 16, 1960 R. E. WADE 2,925,056
FURROW ATTACHMENT FOR GRAIN SEEDERS
Filed Dec. 4, 1956 2 Sheets-Sheet 1
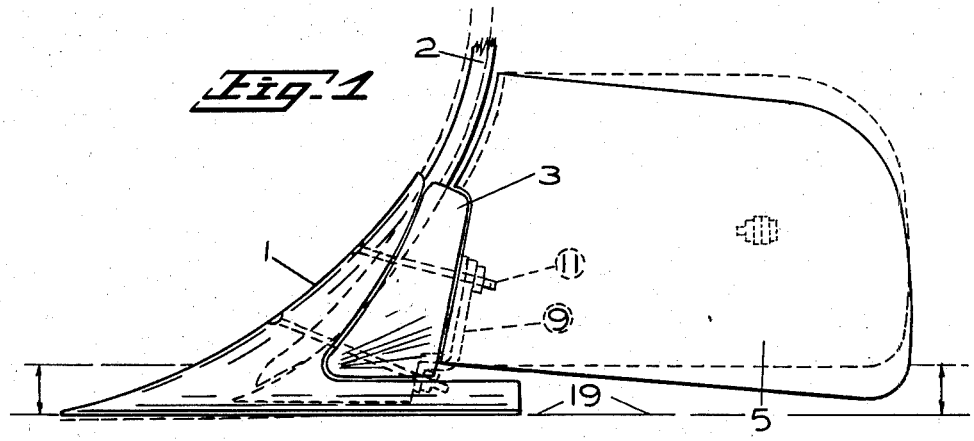
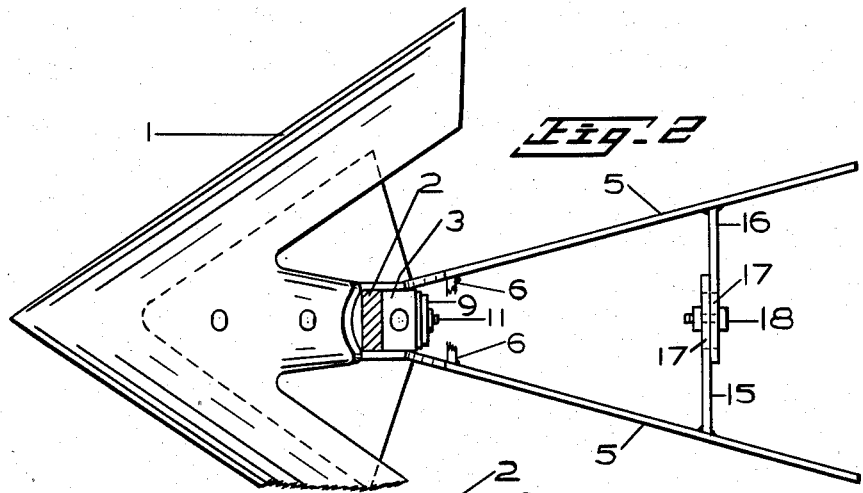
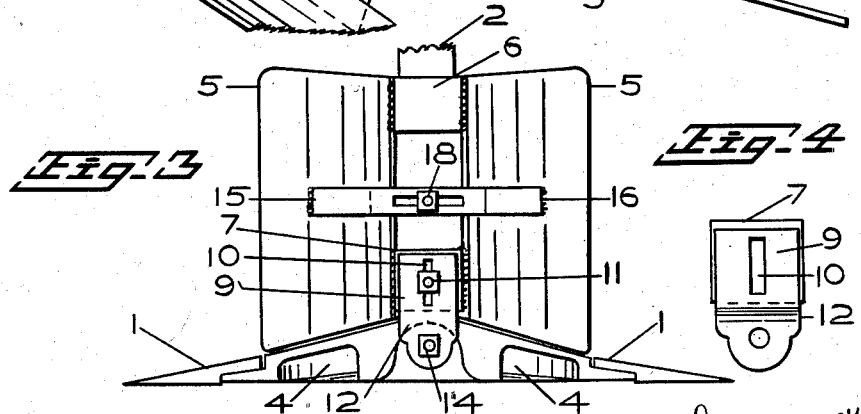
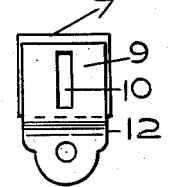
Inventor
Robert Edgar Wade
Per L. A. Mitchell
Attorney Feb. 16, 1960   R. E. WADE   2,925,056
FURROW ATTACHMENT FOR GRAIN SEEDERS
Filed Dec. 4, 1956   2 Sheets-Sheet 2
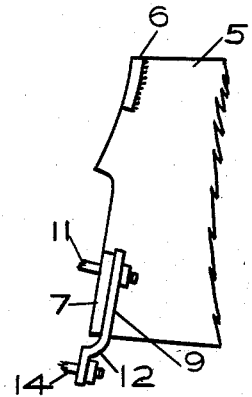
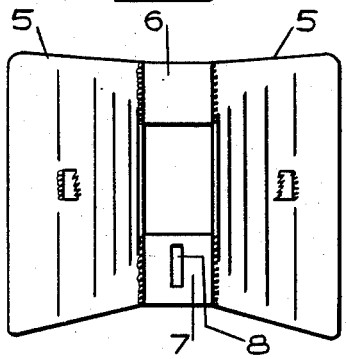
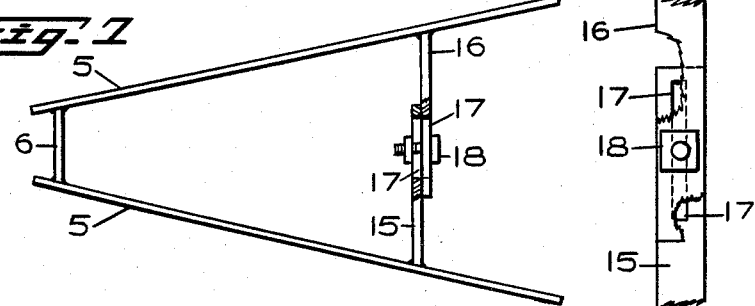
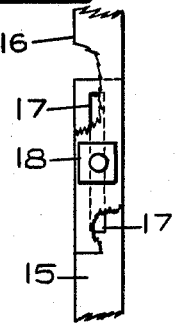
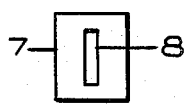
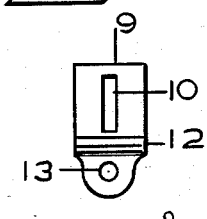
Inventor
Robert Edgar Wade
Per L. L. Mitchell
Attorney

United States Patent Office 2,925,056
Patented Feb. 16, 1960

2,925,056

FURROW ATTACHMENT FOR GRAIN SEEDERS

Robert E. Wade, Consort, Alberta, Canada

Application December 4, 1956, Serial No. 626,223

1 Claim. (Cl. 111—86)

My invention relates to furrow attachments for mounting in following relation to the cultivating feed and seed distributing shoes of grain seeders.

In the art to which the invention relates, in the planting of winter wheat in deep furrow or spring wheat and other grains in semi furrow the seeder opens up furrows in which the seed is deposited and these furrows are left open other than that a small amount of soil is permitted to slide back into the furrow to cover the seed.

In most cases this covering material is dry surface soil and trash which does not promote germination. To overcome this I have provided a furrow attachment for use in following relation to the seed distributing shoe and formed with diverging wings attached to the seeder cultivating foot raised above the bottom level of the furrow and adapted to allow moist bottom soil pressed apart by the attachment to be forced back into the furrow by the pressure it is under, working into the furrow below the diverging wings and covering the seed. In this the dry soil and trash is left on top and a weed free furrow is provided for the press wheels to pack.

Other features and advantages of the invention will become apparent by reference to the accompanying description taken in conjunction with the drawings wherein like characters of reference indicate like parts throughout the several views and wherein:

Fig. 1 is a side elevation of a cultivator foot shown with my improved furrow attachment thereon and with the wing and other parts outlined in phantom, illustrating the relative position of the wing when the shoe is traveling in working relation to the ground.

Fig. 2 is a top plan view of the same, shown partly sectioned and in part broken away.

Fig. 3 shows a rear end elevation of the cultivator foot and furrow attachment, shown with the cultivator shank broken away.

Fig. 4 is a rear end view of the furrow attachment taken by itself.

Fig. 5 shows a side elevation of the attachment.

Fig. 6 shows a rear end view of the attachment shown with the lower attaching bracket removed.

Fig. 7 is a top view of the attachment, shown with the attaching bracket removed.

Fig. 8 is a rear end view of the adjusting plates, shown broken away.

Fig. 9 is a plan view of the lower furrow wing connecting plate.

Fig. 10 is a plan view of the attaching bracket for the furrow opening wings.

Having reference to the drawings 1 indicates a cultivator foot with shank 2 and seed distributing shoe 3, this shoe preferably being of a character as described in my copending application filed September 23, 1953, under serial number 381,860, now Patent No. 2,834,446, and providing grain distributing outlets at 4—4.

My improved furrow attachment is designed to be mounted in following relation to the cultivator foot and comprises diverging wings 5 of spring steel connected together at their forward ends by an upper plate 6 to which the wings are welded and lower plate 7 to which the wings are also welded.

For mounting the wings on the cultivator foot I provide a bracket 9 with slotted opening 10 corresponding to a similar opening 8 in the plate 7 by which the furrow attachment may be vertically adjustable on the cultivator foot attached by a bolt 11 passing through the slots in the plate 7 and bracket 9 and engaging the cultivator foot 1 and shank 2. The bracket 9 further includes an inwardly bent lower end portion 12 with opening 13 for reception of a further bolt 14 securing the attachment bracket 9 to the cultivator foot.

The wings 5 are rearwardly connected together spaced divergingly apart by two bars 15 and 16 welded one to each of the wings 5 and overlapping. These bars have slotted openings 17 for reception of a bolt 18 by which the bars are secured together adjustable endwise and by which the diverging wings may be adjusted apart in relation to each other with greater or less divergence as required.

The wings 5 further are attached slanting rearwardly downward, as more clearly apparent by reference to Figures 1 and 5, for use on a spring type shank common to chisel plows. The rear ends of the wings being lower compensates for the spring back action of the shank and keeps the lower edges of the wings parallel with the furrow bottom when the cultivator foot is traveling in working relation to the ground. The furrow bottom is indicated by the numeral 19, without which the rear end of the wings would ride higher than the front and allow dry soil and trash to filter into the furrow.

In the use of the device the wings are attached to the cultivator foot for travel in the furrow elevated to leave a space between the lower edge of the wings and the furrow bottom through which the pressed back earth may filter to provide a covering of lower moist soil for the seed deposited in the furrow. The attachment may be vertically adjusted slidable on the bolt 11 that engages the bracket 12 and the divergence of the wings altered by means of the bolt 18 connecting the bars 15 and 16.

While I have herein disclosed a preferred embodiment of my invention it is obvious that changes in the construction and arrangement of parts would be readily conceivable, particularly in adapting the device to different makes of implements, but in so far as such changes come within the spirit and scope of the invention as defined in the appended claim they would be considered a part hereof.

Having thus particularly described and ascertained the nature of my said invention what I claim and wish to secure by Letters Patent is:

A furrow attachment for a seeder cultivator of a character providing a shank and a foot carried by the shank, said cultivator including a seed distributing shoe providing a pair of outlets spaced one to each side of the shank, said foot being adapted for opening a furrow in the ground in which seed from the shoe outlets may be deposited, said attachment comprising a pair of wings with connecting plates at the forward ends adapted for attachment on the cultivator shank with the forward ends of the wings spaced apart inwardly of the shoe outlets and the wings diverging rearwardly outward, the rear ends of the wings terminating inward of the furrow sides formed by the cultivator foot, and in which said wings have straight lower edges and are mounted for travel with said edges maintained generally in parallel relation with the bottom of the furrow and spaced therefrom to allow earth to pass under the wings in an amount sufficient only to provide a thin layer over seed rows discharged from the shoe outlets.

References Cited in the file of this patent

UNITED STATES PATENTS

| | | |
|---|---|---|
| 522,829 | Ferrell et al. | Jan. 7, 1896 |
| 1,039,275 | Griffith | Sept. 24, 1912 |
| 1,580,405 | Brown | Apr. 13, 1926 |
| 1,606,799 | Kassebeer | Nov. 16, 1926 |
| 2,396,132 | Shaffer | Mar. 5, 1946 |
| 2,764,111 | Collins | Sept. 25, 1956 |
| 2,771,832 | Doskocil | Nov. 27, 1956 |
| 2,779,263 | Franz et al. | Jan. 29, 1957 |

FOREIGN PATENTS

| | | |
|---|---|---|
| 684,463 | Germany | Nov. 29, 1939 |
| 755,559 | Germany | Apr. 29, 1954 |
| 4,424 | Great Britain | Feb. 28, 1899 |